United States Patent
Shigemori

(10) Patent No.: US 11,360,462 B2
(45) Date of Patent: Jun. 14, 2022

(54) SUPPORT DEVICE AND SUPPORT PROGRAM

(71) Applicant: OMRON Corporation, Kyoto (JP)

(72) Inventor: Yutsuka Shigemori, Kusatsu (JP)

(73) Assignee: OMRON Corporation, Kyoto (JP)

( * ) Notice: Subject to any disclaimer, the term of this patent is extended or adjusted under 35 U.S.C. 154(b) by 17 days.

(21) Appl. No.: 17/251,216

(22) PCT Filed: Jul. 10, 2019

(86) PCT No.: PCT/JP2019/027338
§ 371 (c)(1),
(2) Date: Dec. 11, 2020

(87) PCT Pub. No.: WO2020/026738
PCT Pub. Date: Feb. 6, 2020

(65) Prior Publication Data
US 2021/0247746 A1   Aug. 12, 2021

(30) Foreign Application Priority Data
Jul. 30, 2018 (JP) .............................. JP2018-142647

(51) Int. Cl.
G05B 19/418 (2006.01)
G05B 23/02 (2006.01)
G06F 8/65 (2018.01)

(52) U.S. Cl.
CPC . *G05B 19/41835* (2013.01); *G05B 19/41865* (2013.01); *G05B 23/0216* (2013.01); *G05B 23/0272* (2013.01); *G06F 8/65* (2013.01)

(58) Field of Classification Search
USPC ....................................................... 717/113
See application file for complete search history.

(56) References Cited

U.S. PATENT DOCUMENTS 7,657,329 B1   2/2010 Lloyd
2011/0119605 A1   5/2011 Jayadevan et al.
(Continued)

FOREIGN PATENT DOCUMENTS

EP   3336627   6/2018
JP   H10105147   4/1998
(Continued)

OTHER PUBLICATIONS

"International Search Report (Form PCT/ISA/210) of PCT/JP2019/027338," dated Oct. 8, 2019, with English translation thereof, pp. 1-4.
(Continued)

*Primary Examiner* — Qing Chen
*Assistant Examiner* — Clint Thatcher
(74) *Attorney, Agent, or Firm* — JCIPRNET

(57) ABSTRACT

The objective of the present invention is to simplify the transfer of a program that has been edited. A support device, which assists in the development of a program executed by a target device provided in factory automation (FA), carries out a transfer process for transferring the program to the target device. The program includes a control program for controlling a machine and an HMI program for processing a variable used by the control program. When the control program or the HMI program has been edited, the support device simultaneously transfers the control program and the HMI program respectively to a control device and an HMI device.

9 Claims, 14 Drawing Sheets

(56) References Cited

U.S. PATENT DOCUMENTS

| | | | | |
|---|---|---|---|---|
| 2014/0336785 A1* | 11/2014 | Asenjo | ............... | G05B 19/4185 |
| | | | | 700/17 |
| 2017/0177322 A1* | 6/2017 | Clark | .................... | G06F 11/368 |
| 2019/0258468 A1* | 8/2019 | Chanda | ............... | G06F 11/1433 |
| 2019/0278617 A1* | 9/2019 | Li | ........................... | G06F 9/452 |
| 2021/0141628 A1* | 5/2021 | Garrabrant | ................ | G06F 8/65 |
| 2021/0356944 A1* | 11/2021 | Chauvet | .................... | G06F 9/50 |

FOREIGN PATENT DOCUMENTS

| | | | | |
|---|---|---|---|---|
| JP | H11212607 | | 8/1999 | |
| JP | 2003044105 | | 2/2003 | |
| JP | 2009146229 | | 7/2009 | |
| JP | 2011108008 | | 6/2011 | |
| JP | 2017037466 | | 2/2017 | |
| JP | 2018045544 | | 3/2018 | |
| WO | WO-2013068023 A1 * | 5/2013 | ............... | G06F 8/65 |

OTHER PUBLICATIONS

"Written Opinion of the International Searching Authority (Form PCT/ISA/237) of PCT/JP2019/027338," dated Oct. 8, 2019, with English translation thereof, pp. 1-6.

"Office Action of Japan Counterpart Application" with English translation thereof, dated Oct. 12, 2021, p. 1-p. 4.

"Search Report of Europe Counterpart Application", dated Mar. 17, 2022, p. 1-p. 8.

\* cited by examiner

| Transfer order table | Transfer function |
|---|---|
| PLC(1) | Controller transfer part |
| PLC(2) | Controller transfer part |
| HMI | HMI transfer part |

SUPPORT DEVICE AND SUPPORT PROGRAM

CROSS-REFERENCE TO RELATED APPLICATION

This application is a 371 application of the International PCT application serial no. PCT/JP2019/027338, filed on Jul. 10, 2019, which claims the priority benefits of Japan Patent Application No. 2018-142647, filed on Jul. 30, 2018. The entirety of each of the above-mentioned patent applications is hereby incorporated by reference herein and made a part of this specification.

BACKGROUND

Technical Field

The disclosure relates to a support device and a development support program which support the development of factory automation (FA) programs.

Description of Related Art

FA technology using a control device such as a programmable logic controller (PLC) is widely used in various production and manufacturing sites. Such a control device is a kind of computer, and executes a control program designed to control the FA devices such as a manufacturing device and a manufacturing facility. Further, a human machine interface (HMI) device applied to the field of FA displays information on the FA device obtained by the PLC or the like on the screen by executing the HMI program. Further, in the HMI program, an operator such as a production manager can operate the HMI screen by touching or the like to set data referred to by the control program via the HMI screen.

In this way, the HMI program and the control program are related to each other, so when the control program is changed to add a new program or variable, in many cases, the HMI program is changed to change the screen configuration, such as displaying the value of the additional variable. When the program is changed in this way, it is necessary to transfer the changed HMI program and the changed control program to the HMI device and the PLC, respectively.

Generally, even if the development environment of the HMI program and the control program is integrated, since the transfer destinations (the HMI device and the PLC) are different, it takes time and effort to transfer the changed (updated) HMI program and the changed (updated) control program. Therefore, there is a request to simplify such transfers and to reduce time and effort.

Patent Document 1 (Japanese Laid-open Publication No. H10-105147) discloses the transfer of operation screen data to a programmable display device to which a PLC can be connected. Specifically, by comparing the data that specifies each unit screen file with the data that specifies the update time, only the data files that are in the same project and have undergone a change process are selectively transferred.

RELATED ART

Patent Document

[Patent Document 1] Japanese Laid-open No. H10-105147

SUMMARY

Technical Problem

Patent Document 1 discloses a configuration for transferring a data file of a unit screen file which has undergone a change process, but does not disclose that a program executed on the PLC side is transferred in conjunction with the transfer of the screen data file.

The disclosure provides a program development support environment that simplifies the transfer of an HMI program or a control program when the HMI program or the control program has been edited.

Solution to the Problem

A support device according to an embodiment of the disclosure is a support device which supports development of a program to be executed by a target device provided in factory automation (FA). The target device includes a control device which controls a machine of the FA and a human machine interface (HMI) device. The support device includes an editing part which edits the program, and a transfer management part which executes a transfer process for transferring the program that is edited to the target device.

The program includes a control program for controlling the machine and an HMI program for processing a variable used by the control program. The transfer management part includes a part which executes the transfer process to simultaneously transfer the control program and the HMI program respectively to the control device and the HMI device when the control program or the HMI program is edited by the editing part.

According to the above disclosure, when the HMI program or the control program is edited, both programs are simultaneously transferred to the target device. Therefore, when the HMI program or the control program is edited such as being modified, the program is automatically transferred to the target device, and it is possible to prevent omission of the program transfer to the target device.

In the above disclosure, the support device further includes a determination part which compares each program of the control program or the HMI program that is edited by the editing part with a corresponding program being executed by the target device to determine based on a result of the comparison whether each of the programs that is edited has been changed from the corresponding program being executed, and the transfer management part further includes a part which executes the transfer process to transfer one or both programs determined to have been changed among each program of the control program and the HMI program edited by the editing part.

According to the above disclosure, the program to be transferred can be determined by comparing the edited program with the program being executed by the target device.

In the above disclosure, the support device further includes a notification part which makes information based on a determination result by the determination part be displayed on a display, and an operation receiving part which receives a user operation on the support device. The transfer management part includes a part which executes the transfer process to transfer one or both programs indicated by a received user operation content among each program of the control program and the HMI program edited by the editing part.

According to the above disclosure, the user can selectively specify the program to be transferred by referring to the change determination result.

In the above disclosure, an activation instruction for activating each program after transfer is transmitted to the target device when the transfer process of the control program or the HMI program is executed by the transfer management part.

According to the above disclosure, in addition to the transfer of the program to the target device, an instruction can be given to each target device to activate the program after transfer.

In the above disclosure, the activation instruction includes information on a time for activating each program after transfer.

According to the above disclosure, the activation instruction can be used to instruct the target device for the time to activate the program after transfer.

In the above disclosure, the activation instruction is transmitted to the target device when a notification that the transfer of the program is completed is received from the target device.

According to the above disclosure, the activation instruction can be given to the target device when it is confirmed that the transfer of the program to the target device is completed.

In the above disclosure, the HMI program includes a user interface (UI) component which is a program that configures the HMI program and which processes the variable, and editing of the HMI program includes editing of the UI component.

According to the above disclosure, when the UI component is edited, the transfer process by the transfer management part described above can be executed on the UI component as a target.

In the above disclosure, the control program includes a variable and a program code which indicates a process content using the variable, and a predetermined notification is output to a display of the HMI device when a result of the comparison indicates that the program code is changed without the variable changed.

According to the above disclosure, when the program code of the control program is changed, the process result of the variable by the HMI program may change, and a notification indicating this can be output to the user.

A support program according to an embodiment of the disclosure is a support program which supports development of a program to be executed by a target device provided in factory automation (FA). The target device includes a control device which controls a machine provided in the FA and a human machine interface (HMI) device. The support program is configured to make a computer execute editing the program, and executing a transfer process for transferring the program that is edited to the target device. The edited program includes a control program for controlling the machine and an HMI program for processing a variable used by the control program. The executing the transfer process includes executing the transfer process to simultaneously transfer the control program and the HMI program respectively to the control device and the HMI device when the control program or the HMI program is edited.

According to the above disclosure, by executing the support program by the computer, when the HMI program or the control program is edited, both programs are simultaneously transferred to the target device. Therefore, when the HMI program or the control program is edited such as being modified, the program is automatically transferred to the target device, and it is possible to prevent omission of the program transfer to the target device.

Effects

According to the disclosure, it is possible to provide a program development support environment which simplifies the transfer of the HMI program or the control program when the HMI program or the control program has been edited.

BRIEF DESCRIPTION OF THE DRAWINGS

FIG. 8 is a diagram schematically showing an example of a transfer order table 234 referred to by the transfer manager 231 according to an embodiment of the disclosure.

DESCRIPTION OF THE EMBODIMENTS

Figure 1:
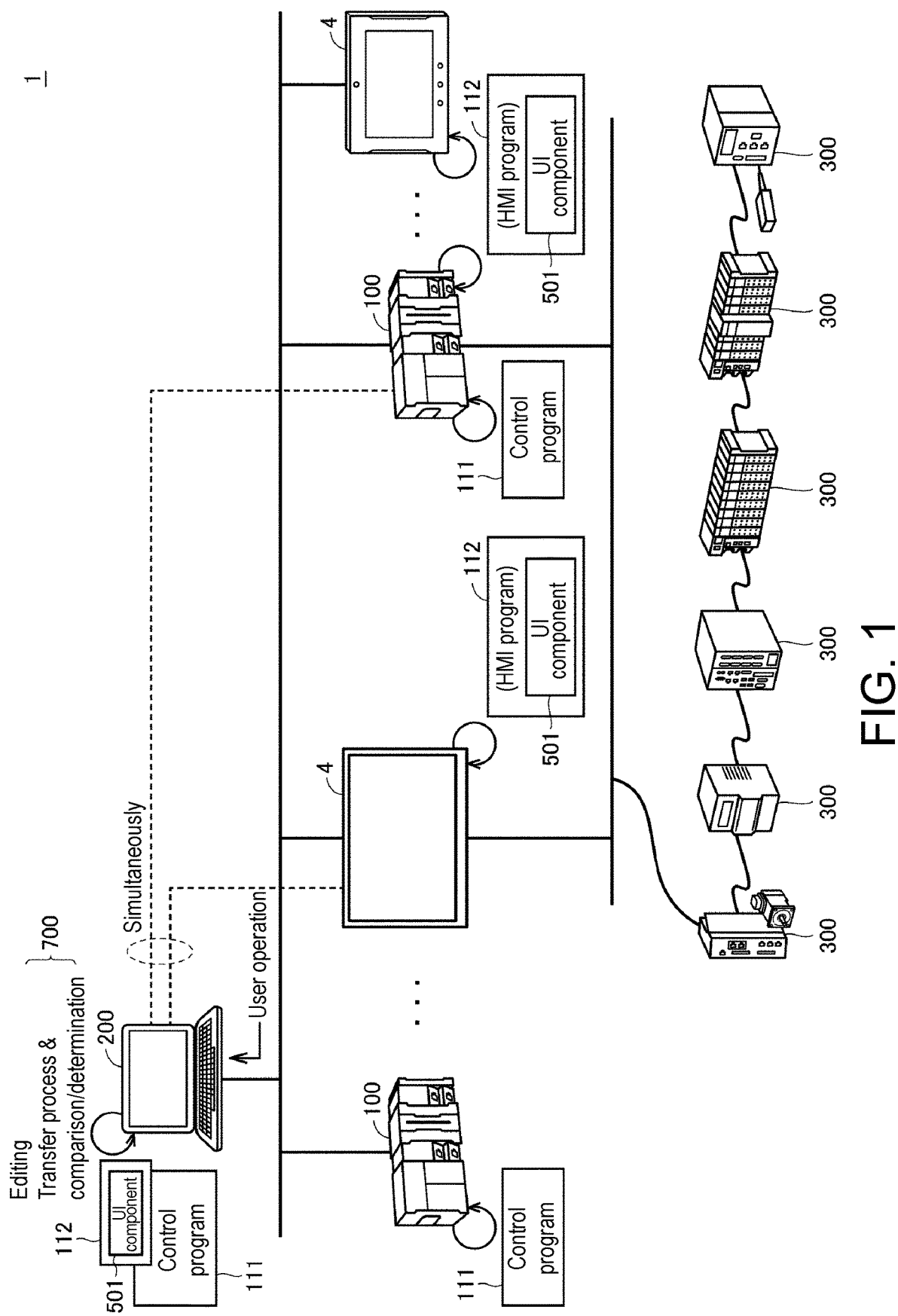
FIG. 1 is a diagram schematically showing a configuration of a system according to an embodiment of the disclosure.

Embodiments of the disclosure will be described in detail below with reference to the drawings. Further, in the drawings, the same or corresponding parts are denoted by the same reference numerals, and descriptions thereof will not be repeated.

A. APPLICATION EXAMPLE

First, an example of a scenario where the disclosure is applied is described with reference to FIG. 1. FIG. 1 is a diagram schematically showing a configuration of a system according to an embodiment of the disclosure. With reference to FIG. 1, a system 1 for FA network-connects one or more programmable controllers (PLCs) 100, one or more HMI devices 4 and a support device 200 that communicate with multiple devices 300.

The PLC 100 is an embodiment of a "control device." The PLC 100 is a kind of computer, and executes a user program such as a control program 111 for controlling a device which is a control target designed according to each device 300 such as a manufacturing device and a manufacturing facility.

The control program 111 corresponds to a variable program and may typically include a sequence program. The sequence program includes, for example, a so-called IEC program configured by one or more instructions that are described according to the international standard IEC 61131-3 defined by the International Electrotechnical Commission (IEC). The sequence program may include various instructions including sequence instructions and/or motion instructions. Nevertheless, the sequence program is not limited to the instructions described in accordance with the international standard IEC 61131-3, and may include an instruction that is defined independently by the manufacturer or vendor of the PLC. In this embodiment, the control program 111 may be referred to as an IEC program.

Further, the HMI device 4 is also a kind of computer and executes an HMI program 112 which is a user program. Such a control program 111 and an HMI program 112 are developed by executing a support program 700 in the support device 200 that provides the program development environment.

The support device 200 is, for example, a general-purpose computer, provides an environment for integrating and developing various programs of the system 1, and transfers the various developed programs to the HMI device 4 and the PLC 100. The devices 300 network-connect a field device provided in FA (now shown) serving as a control target. The control target may include, for example, a sensor, an actuator and the like.

The support device 200 edits the control program 111 or the HMI program 112 that processes variables used by the control program 111 according to instructions indicated by a user operation content for the support device 200. When the control program 111 or the HMI program 112 is edited, the support device 200 performs a transfer process to simultaneously transfer the control program 111 and the HMI program 112 respectively to the PLC 100 and the HMI device 4.

In this way, in the support device 200, the development environment of the HMI program 112 and the control program 111 is integrated. As a background of the embodiment, the HMI program 112 processes the variables used by the control program 111 by being executed. In this way, both programs are related to each other. For a specific example, in the program development environment, for example, when a screen configuration using a UI component 501 of the HMI program 112 is updated, the PLC side may also add a new program and a variable corresponding to the screen. As described above, since the HMI program 112 and the control program 111 are related to each other, when the HMI program 112 or the control program 111 is edited, there is a request to transfer both the HMI program 112 and the control program 111 respectively to the HMI device 4 and the PLC 100. When the program is edited, the support device 200 responds to the request by simultaneously transferring the HMI program 112 and the control program 111. As a result, it is not necessary to reconnect the target device (the HMI device 4 or the PLC 100) to the support device 200 (or reselect by the user in the development environment) to perform the transfer process, and the time and effort required for the transfer can be reduced.

In the transfer process described above, each program of the edited control program 111 or HMI program 112 is compared with the corresponding program being executed by the target device, and a comparison/determination is performed based on the comparison result to determine whether each edited program has been changed from the corresponding program being executed. In the transfer process, a process is executed to transfer one or both programs of the edited control program 111 or HMI program 112 determined to have been changed by the comparison/determination. As a result, only programs that have been changed by editing from the programs being executed by the target device can become targets of the transfer process.

The criteria for comparing programs in the comparison/determination described above include, for example, a file name, a creation (editing) date, a size of a program code (for example, an object code), and a hash value calculated from the program code, and one or a combination of these criteria can be used as the criteria for comparison.

In the system 1, a transmission line conforming to, for example, the universal serial bus (USB) is adopted between the support device 200 and the PLC 100. For the transmission line of the PLC 100 and the devices 300, for example, it is preferable to adopt a bus or network in which the arrival time of data is guaranteed conforming to the time-sensitive network (TSN) standard. For example, EtherCAT (registered trademark), which is an example of a network for machine control, may be adopted.

The user program developed in the support device 200 is transferred from the support device 200 to the PLC 100 or the HMI device 4 and executed by the processor of the PLC 100 or the HMI device 4.

The control calculation using variables by the control program 111 includes a process of processing data such as state values collected or generated by the devices 300 from the field device, a process (calculation process) of generating data such as a control instruction to the devices 300, a process (output process) of transmitting the generated output data to the target devices 300, and the like.

The HMI process executed by the HMI program 112 includes a process of processing the values of the variables used by the control program 111. The process of processing the values of such variables includes, for example, a process of collecting the values indicated by the variables used in the control calculation, a process of outputting the collected information on the screen, and a process of receiving a user operation via the screen or the like. The values of the variables to be collected include state values (for example, output values detected by the sensor, such as the rotation speed, the rotation direction, the rotation angle and the like of the motor) of the control target and the like. Further, the user operation includes, for example, an operation for setting in variables a control instruction to various devices, a setting value for control, and the like.

Hereinafter, a program development environment provided by the support device 200 by executing the support program 700 according to the embodiment will be described in detail as a more specific application example of the disclosure.

B. EXAMPLE OF HARDWARE CONFIGURATION OF PLC 100

Figure 2:
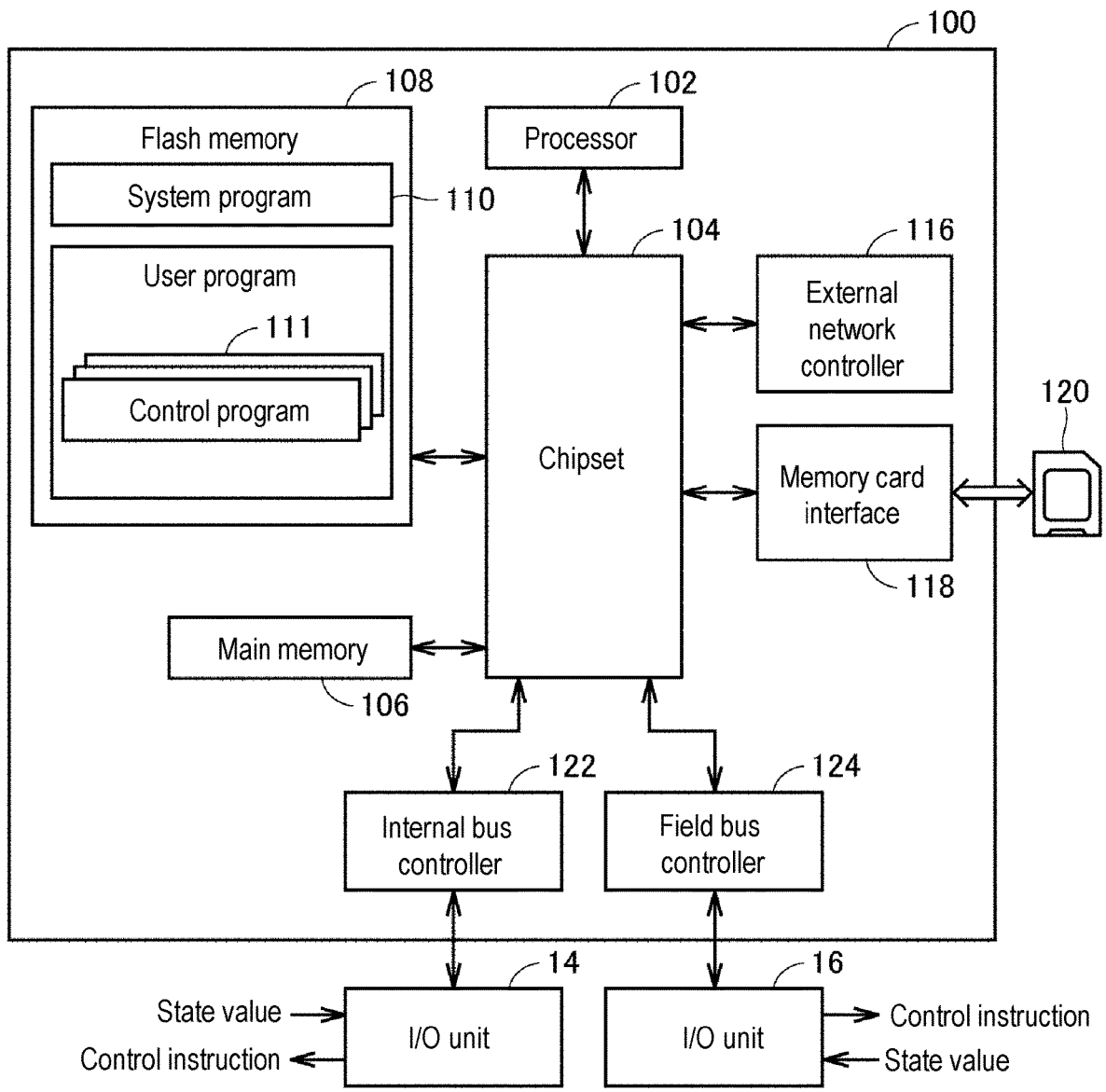
FIG. 2 is a diagram schematically showing an example of a hardware configuration of the PLC 100 according to an embodiment of the disclosure.

FIG. 2 is a diagram schematically showing an example of a hardware configuration of the PLC 100 according to an embodiment of the disclosure. With reference to FIG. 2, the PLC 100 includes a processor 102, such as a central processing unit (CPU) or a micro-processing unit (MPU), a chipset 104, a main memory 106, a flash memory 108, an external network controller 116, a memory card interface 118, an internal bus controller 122, and a field bus controller 124.

A system program 110 and a user program are stored in the flash memory 108. The system program 110 includes an instruction code for providing basic functions of the PLC 100 such as the data input/output process and the execution timing control.

The user program includes the control program 111 and a library in which a function called by the control program 111 and the like are stored.

The processor 102 reads the system program 110 and the user program stored in the flash memory 108, expands them in the main memory 106, and executes them to realize the control process for the control target such as the devices 300 or the field device.

The chipset 104 realizes processes of the PLC 100 as a whole by controlling each component.

The internal bus controller 122 is an interface for exchanging data between the PLC 100 and an I/O unit 14 connected through an internal bus. The field bus controller 124 is an interface for exchanging data between the PLC 100 and an I/O unit 16 connected through a field bus (not shown). The internal bus controller 122 and the field bus controller 124 obtain state values input to the corresponding I/O units 14 and 16, respectively, and output calculation results of the processor 102 as instruction values from the corresponding I/O units 14 and 16, respectively.

The external network controller 116 controls the exchange of data through various wired/wireless networks. The memory card interface 118 is configured to allow a memory card 120 to be attached thereto or detached therefrom, and is capable of writing data to the memory card 120 and reading data from the memory card 120. The PLC 100 exchanges data with the support device 200 via the external network controller 116 or the memory card interface 118. Further, the PLC 100 exchanges data with the HMI device 4 via the external network controller 116.

A part or all of the functions provided by the PLC 100 executing the programs may be implemented as a dedicated hardware circuit.

C. EXAMPLE OF HARDWARE CONFIGURATION OF SUPPORT DEVICE 200

Figure 3:
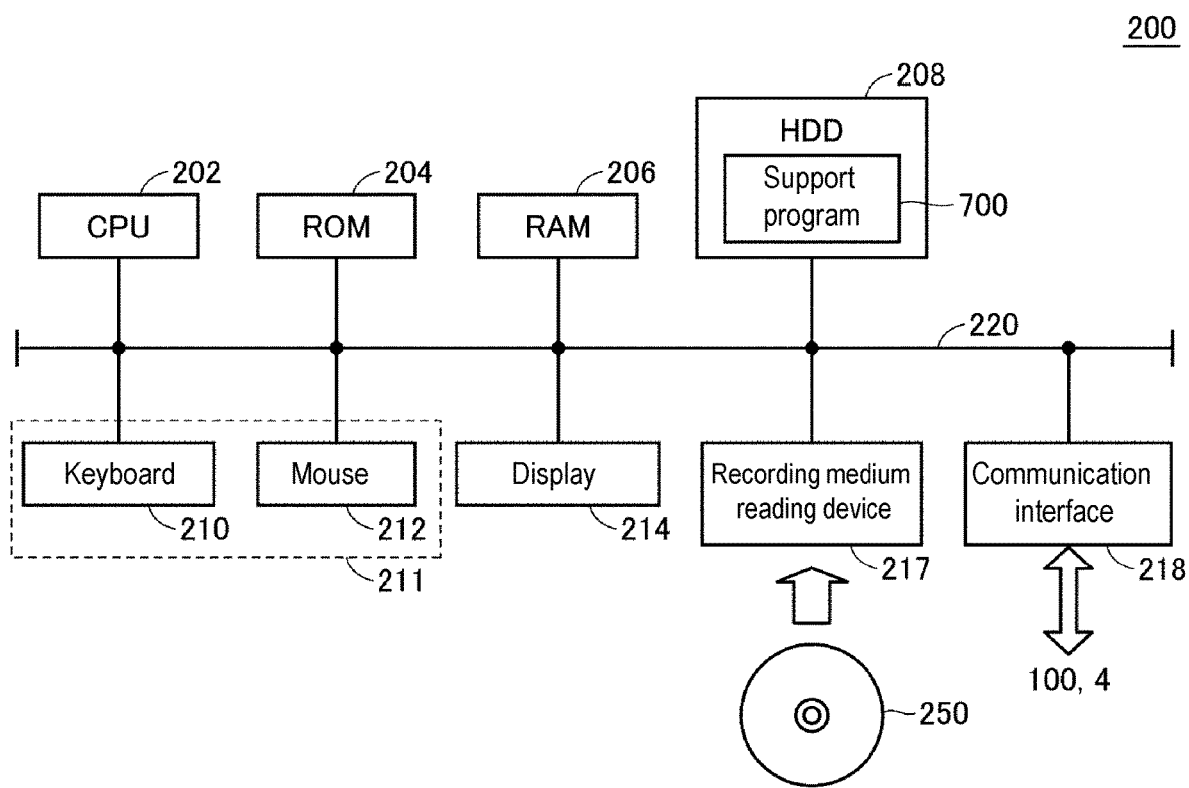
FIG. 3 is a diagram schematically showing an example of a hardware configuration of the support device 200 according to an embodiment of the disclosure.

Next, an example of a hardware configuration of the support device 200 will be described. FIG. 3 is a diagram schematically showing an example of a hardware configuration of the support device 200 according to an embodiment of the disclosure. With reference to FIG. 3, the support device 200 may be a stationary type, or may be provided in the form of a notebook type personal computer having good portability at the manufacturing site where the PLC 100 is disposed.

The support device 200 includes a CPU 202 which executes various programs including an operating system (OS), a read only memory (ROM) 204 which stores a basic input/output system (BIOS) and various data, a random access memory (RAM) 206 which is a memory that provides a work area for storing data necessary for executing the programs by the CPU 202, and a hard disk (HDD) 208 which non-volatilely stores various programs including the support program 700 and the like executed by the CPU 202. When executed, the support program 700 realizes a program development environment for the user program in the support device 200, and provides a function of supporting the development of the user program.

The support device 200 further includes an input part 211 including a keyboard 210 and a mouse 212 which receive user operations on the support device 200, and a display 214 for presenting information to the user. The support device 200 includes a communication interface 218 for communicating with external devices including the PLC 100 and the HMI device 4. The input part 211 may be provided as a touch panel integrally configured with the display 214. Each part of the support device 200 communicates with each other via an internal bus 220.

The support device 200 includes a recording medium reading device 217 for detachably mounting a recording medium 250 and reading the support program 700 stored in the recording medium 250 from the mounted recording medium 250. The read support program 700 is stored in the HDD 208. The support program 700 may include a program that realizes a program development environment. The recording medium 250 may be distributed in a state in which the support program 700 or the like to be executed by the support device 200 is stored. Further, the recording medium 250 includes a general-purpose semiconductor storage device such as a compact flash (CF) or a secure digital (SD), a magnetic storage medium such as a flexible disk, an optical storage medium such as a compact disk read only memory (CD-ROM), and the like.

D. EXAMPLE OF HARDWARE CONFIGURATION OF HMI DEVICE 4

Figure 4:
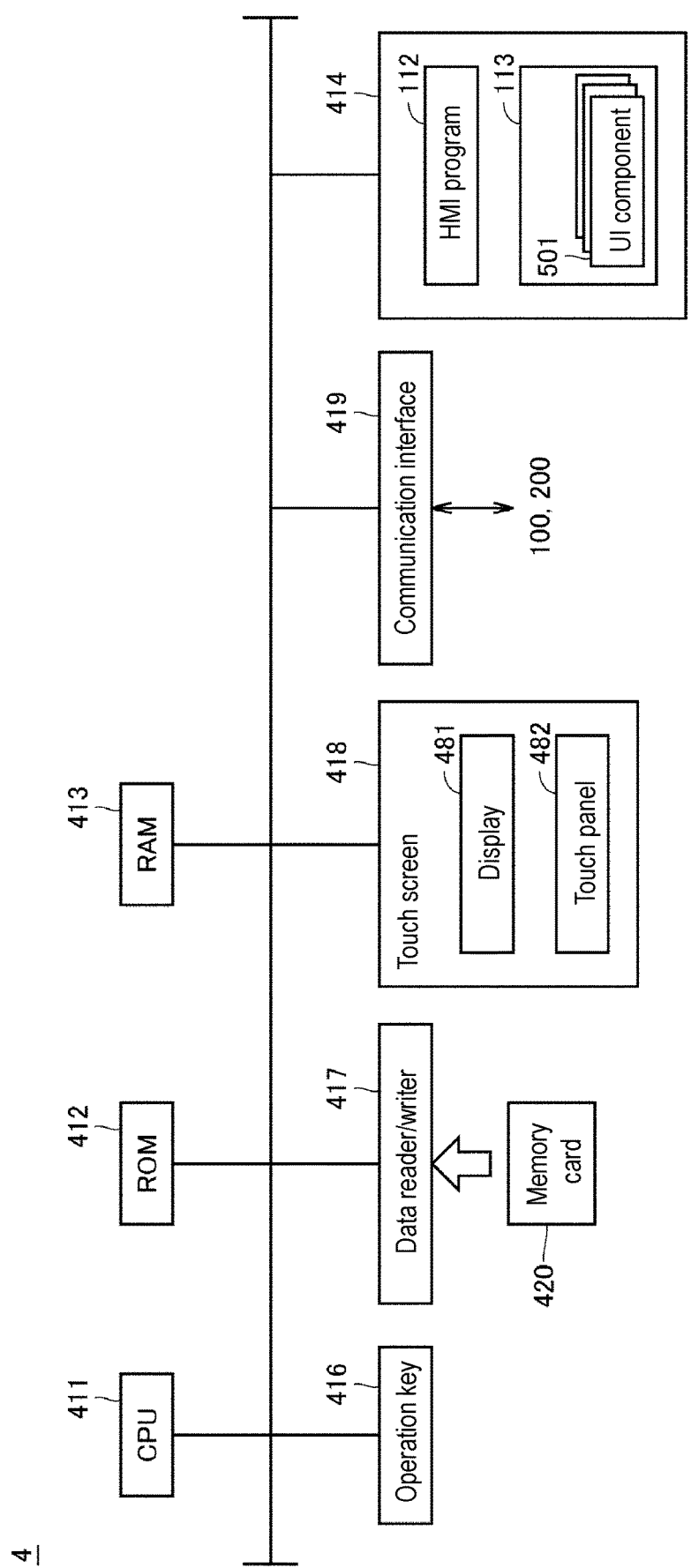
FIG. 4 is a diagram schematically showing an example of a hardware configuration of the HMI device 4 according to an embodiment of the disclosure.

FIG. 4 is a diagram schematically showing an example of a hardware configuration of the HMI device 4 according to an embodiment of the disclosure. The HMI device 4 may be a stationary type, or may be provided in the form of a notebook type personal computer having good portability at the manufacturing site where the PLC 100 is disposed.

With reference to FIG. 4, the HMI device 4 includes a CPU 411, a read only memory (ROM) 412, a random access memory (RAM) 413, a flash ROM 414 for non-volatilely storing various programs and data, an operation key 416 for receiving user operations, a data reader/writer 417, a touch screen 418, and a communication interface 419. Further, each of these parts is connected to each other via an internal bus.

The flash ROM 414 stores, for example, the HMI program 112 and the library 113 including one or more UI components 501 configuring the HMI program 112. The HMI program 112 and the UI component 501 is configured by a code executable by the HMI device 4. The "UI component" includes image data, text data, a program code, and the like that configure the HMI program 112. When the HMI program 112 is executed and the screen is displayed, a picture, a character string and the like are displayed by the UI component, and a function is also provided by executing the program code. The provided function may include displaying an image based on the values of the variables used by the control program 111, receiving the user operations for setting values in the variables, and the like.

The touch screen 418 includes a display 481 which functions as a display part and a touch panel 482 for receiving user input. The communication interface 419 communicates with external devices including the PLC 100 and the support device 200.

The data reader/writer 417 mediates data transmission between the CPU 411 and the memory card 420, which is an example of an external storage medium. Further, another output device such as a printer may be connected to the HMI device 4 if necessary.

E. EXAMPLE OF USAGE ASPECT OF HMI PROGRAM

Figure 5:
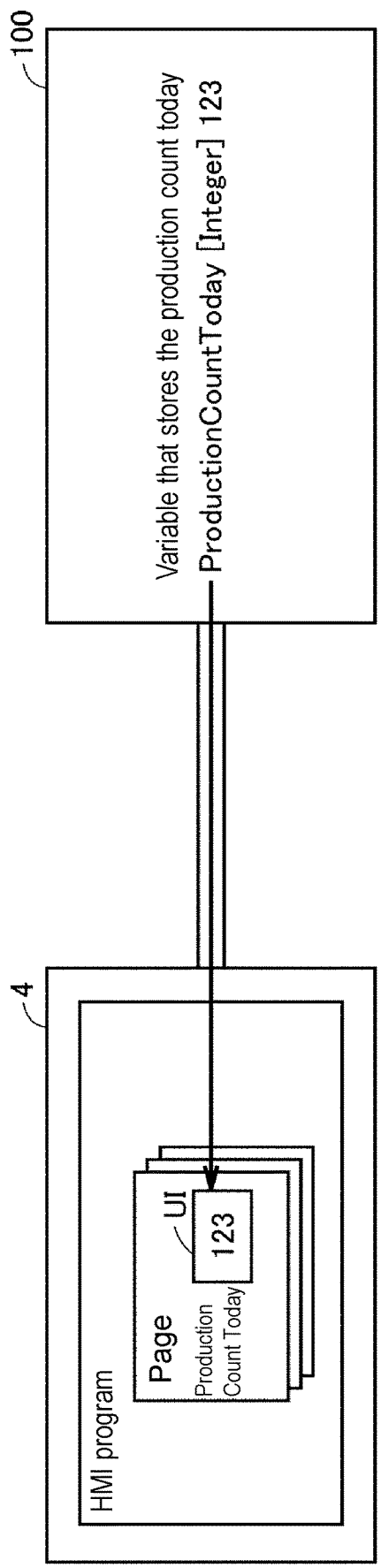
FIG. 5 is a diagram schematically showing a usage aspect of the HMI program 112 according to an embodiment of the disclosure.

FIG. 5 is a diagram schematically showing a usage aspect of the HMI program 112 according to an embodiment of the disclosure. The HMI device 4 executes each page of the HMI program 112 by executing the HMI program 112 created by the support device 200, and displays a screen on the display 481. When the screen is displayed, the program code of the UI component configuring the screen is executed, whereby the HMI device 4 transmits a request for the values of the variables used by the control program 111 via the network. The HMI device 4 receives the requested values of the variables from the PLC 100 as a response, and displays the received values in association with the UI component of the screen. In this way, the operator (user) can monitor the state values of the control target (for example, "123" in FIG. 5).

Further, when the operator operates the UI component of the screen and inputs a value, the code of the UI program is executed, whereby the HMI device 4 transmits a request for setting an input value (such as a threshold value, a target value, and the like) to the variable used by the control program 111 via the network. The PLC 100 sets the value requested to be set in the variable, and executes the control program 111 using the set value. In this way, the operator can operate the HMI screen to specify a value for controlling the control target.

F. DEVELOPMENT ENVIRONMENT OF PROGRAM

Figure 6:
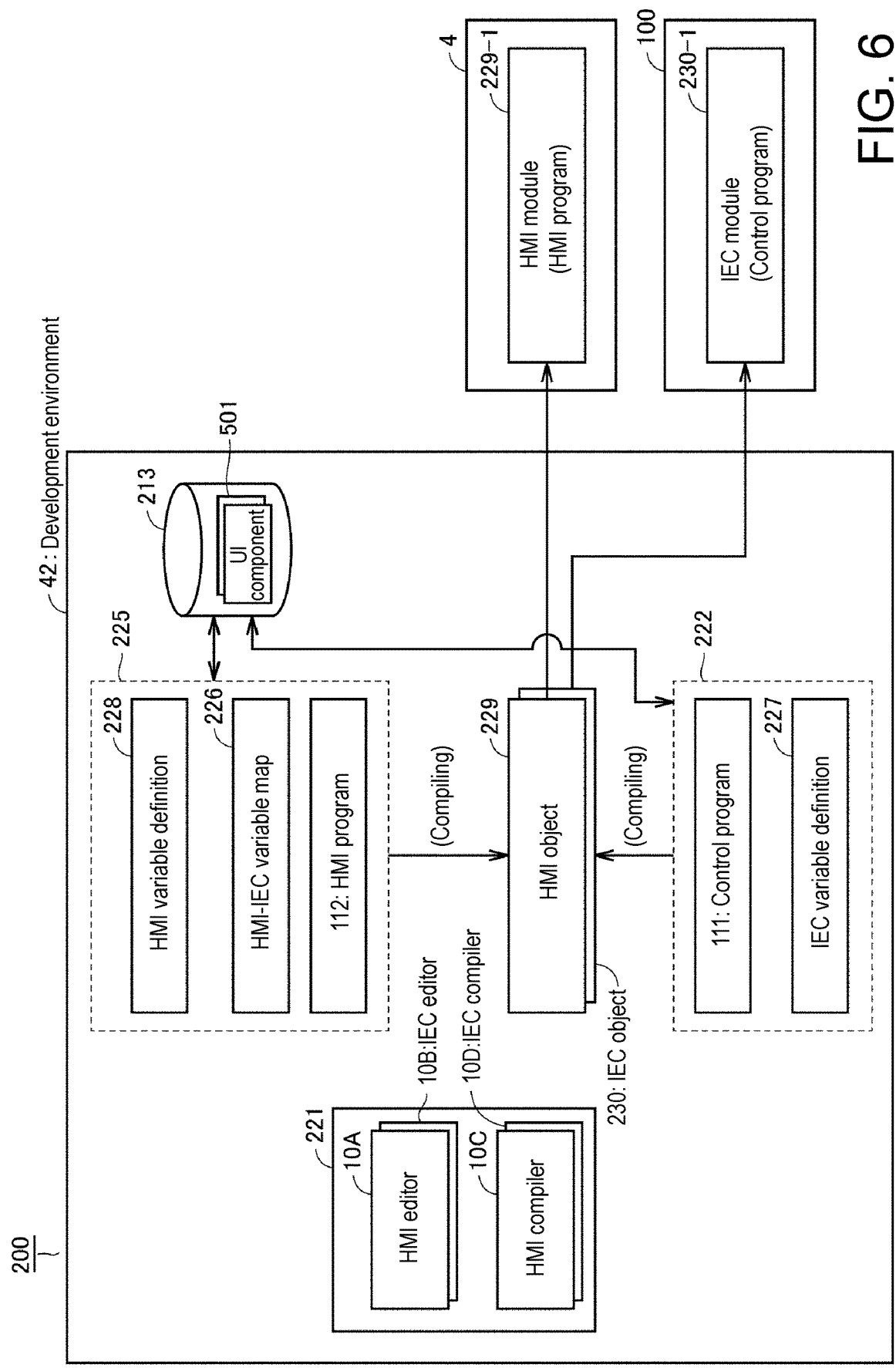
FIG. 6 is a diagram schematically showing an example of a program development environment 42 in the support device 200 according to an embodiment of the disclosure.

FIG. 6 is a diagram schematically showing an example of a program development environment 42 in the support device 200 according to an embodiment of the disclosure. With reference to FIG. 6, the development environment 42 includes a library 213 having data such as the UI component 501 and various functions, and a development tool 221. The development tool 221 includes an HMI editor 10A, an IEC editor 10B, an HMI compiler 10C and an IEC compiler 10D.

The HMI editor 10A creates (edits) the HMI program 112 and the UI component 501 of the library 213 according to the user operation from the input part 211, thereby generating an HMI project 225 which is information for configuring the HMI program 112. Similarly, the IEC editor 10B creates (edits) various functions for the control program 111 and the control program of the library 213 according to the user operation from the input part 211, thereby generating an IEC project 222 which is information for configuring the control program 111 (IEC program).

The HMI project 225 includes the HMI program 112, an HMI variable definition 228 indicating the definitions of the variables (the variable name, the data type, the identifier of device in which the variables are used and the like) used by the UI component 501 configuring the HMI program 112, an HMI-IEC variable map 226 and the like. The IEC project 222 includes the control program 111 which is an IEC program, an IEC variable definition 227 which indicates the definitions of the variables (the variable name, the data type, the identifier of device in which the variables are used and the like) used by the control program 111 and the functions called in the control program 111, and the like. In the HMI-IEC variable map 226, among the HMI variables defined in the HMI variable definition 228, each HMI variable associated with the IEC variable defined in the IEC variable definition 227 is registered as a set associated with the IEC variable.

When the compiler is activated, the project is compiled. Specifically, the HMI compiler 10C compiles the HMI project 225 and outputs an HMI object 229 converted into executable code. The IEC compiler 10D compiles the IEC project 222 and outputs an IEC object 230 converted into executable code. In the embodiment, the executable code includes, for example, a binary code.

The support device 200 transfers the HMI object 229 to the HMI device 4 and also transfers the IEC object 230 to the PLC 100.

In the HMI device 4, an HMI module 229-1 executable by the HMI device 4 is generated by linking the UI component 501 that is an executable code of the library 113 to the HMI program 112 (the HMI object 229) received from the support device 200. Further, in the PLC 100 as well, an IEC module 230-1 executable by the PLC 100 is generated by linking various functions that are executable codes of the library 113 to the control program 111 (the IEC object 230) received from the support device 200. The target device is controlled by executing the control program 111 (the IEC module 230-1) by the PLC 100, and the HMI program 112 (the HMI module 229-1) is executed by the HMI device 4. At this time, each time the HMI device 4 displays the screen of each page of the HMI program 112, the HMI device 4 requests the PLC 100 for the value of the variable used by the UI component configuring the page as shown in FIG. 5, and displays the value received from the PLC 100 as the response as a UI component of the screen of each page.

G. CONFIGURATION OF TRANSFER BY TRANSFER MANAGER

Figure 7:
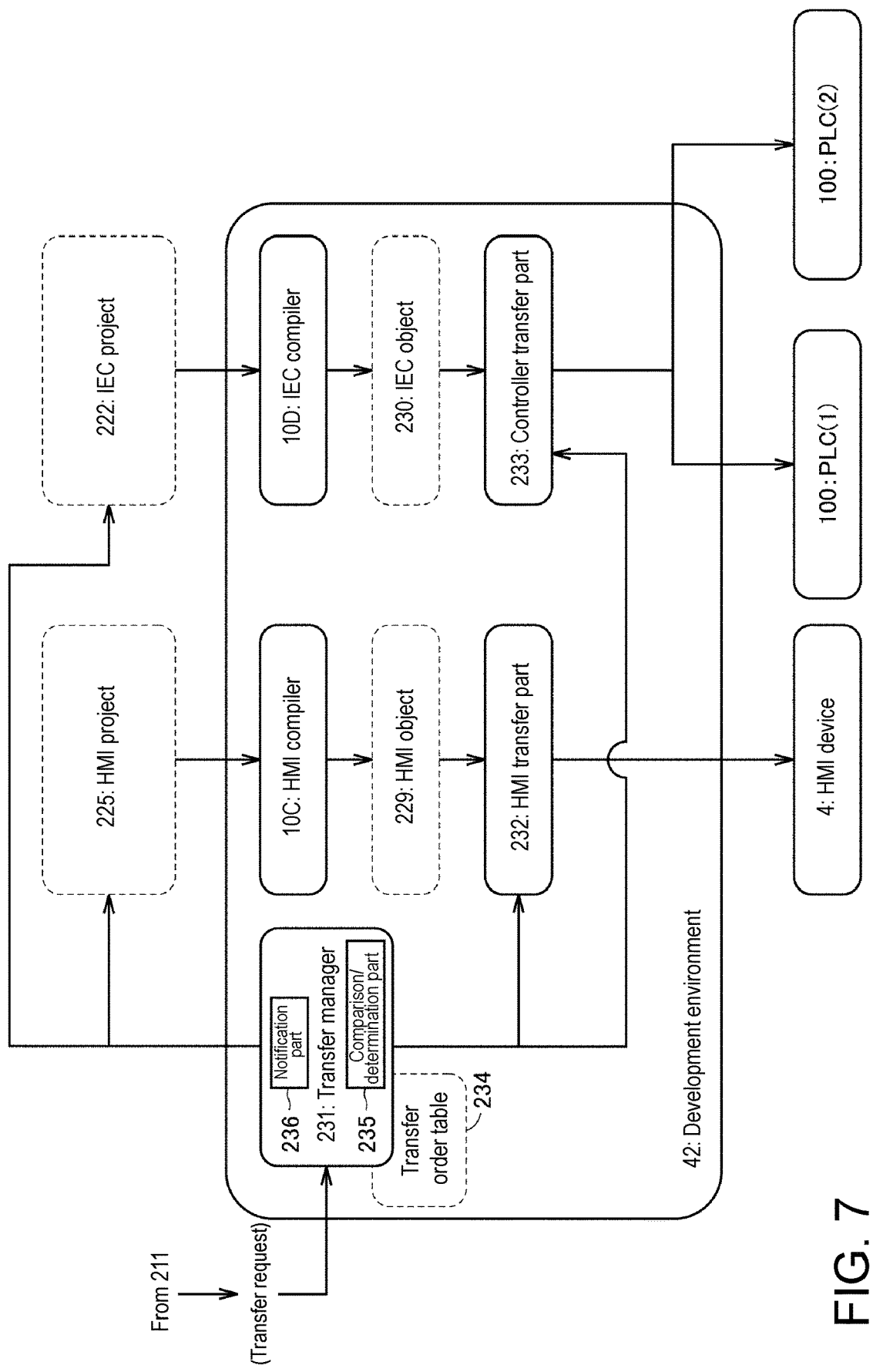
FIG. 7 is a diagram schematically illustrating an example of a transfer process by a transfer manager 231 according to an embodiment of the disclosure.

FIG. 7 is a diagram schematically illustrating an example of a transfer process by a transfer manager 231 according to an embodiment of the disclosure. With reference to FIG. 7, in addition to the configuration of FIG. 6, the development environment 42 includes a transfer manager 231 which is an embodiment of a "transfer management part," an HMI transfer part 232 which transfers the HMI object 229 to the HMI device 4 via the communication interface 419, and a controller transfer part 233 which transfers the IEC object 230 to the PLC 100 via the communication interface 419. The transfer manager 231 has a comparison/determination part 235 and a notification part 236, which will be described later.

FIG. 8 is a diagram schematically showing an example of a transfer order table 234 referred to by the transfer manager 231 according to an embodiment of the disclosure. With reference to FIG. 8, in the transfer order table 234, device information (the identifier of the PLC 100 or the HMI device 4) registered according to the transfer order and transfer functions corresponding to the information of each device are registered. As for the transfer function, if the corresponding device is the PLC 100, the controller transfer part 233 is registered, and if it is the HMI device 4, the HMI transfer part 232 is registered.

The transfer manager 231 extracts the devices (the HMI device 4 and the PLC 100) to be the transfer destinations of the HMI object 229 and the IEC object 230 from the devices connected to the HMI device 4. The transfer manager 231 determines the order in which the programs are transferred to the corresponding devices for each extracted device, and stores the identifiers of the corresponding devices in the transfer order table 234 according to the determined order.

Specifically, the transfer manager 231 scans the code of the object which is the transfer target (the HMI object 229 or the IEC object 230) and extracts the identifier of the device which executes the corresponding object. The identifier of this device is extracted, for example, by scanning the HMI variable definition 228 or the IEC variable definition 227.

In general, since the HMI device 4 operates depending on the PLC 100, when registering the identifier of the extracted device, the transfer manager 231 registers the identifier of the device in the transfer order table 234 so that the transfer is performed in the order of the PLC 100→the HMI device 4. Further, the transfer manager 231 registers the transfer function (the identifier of the HMI transfer part 232 or the controller transfer part 233) according to the type of the corresponding device (the PLC 100 or the HMI device 4) corresponding to the identifier of each device registered in the transfer order table 234.

Further, the information (identifier) of the connected device registered in the transfer order table 234 includes the network address of the connected device (the HMI device 4 or the PLC 100) and the like. The HMI transfer part 232 and the controller transfer part 233 transmit the HMI object 229 and the IEC object 230 to the destination devices, respectively, with the network addresses indicated by the information of the connected devices output from the transfer manager 231 as the destinations.

The transfer manager 231 receives a "transfer completion" response from the transfer target device via the HMI transfer part 232 or the controller transfer part 233.

(G1. Determination of Transfer Target Data Based on Change)

The transfer manager 231 determines the transfer target data to be transferred to the HMI device 4 and the PLC 100. Specifically, the comparison/determination part 235 of the transfer manager 231 compares each program of the control program 111 edited by the IEC editor 10B or the HMI program 112 edited by the HMI editor 10A with the corresponding program being executed by the PLC 100 or the HMI device 4 that is the target device. In this case, the comparison/determination part 235 receives the IEC program or the HMI program being executed from the PLC 100 or the HMI device 4. The comparison/determination part 235 determines from the comparison result whether each edited program has been changed from the corresponding program being executed by the target device.

The criteria for comparing the programs include, but are not limited to, for example, the file name, the creation (editing) date, the size of the program code (for example, the object code), and the hash value calculated from the program code. One or a combination of these criteria can be used as the criteria for comparison.

The transfer manager 231 executes the transfer process on one or both programs of the edited control program 111 and the HMI program 112 determined to have been changed by the comparison/determination part 235 via the HMI transfer part 232 or the controller transfer part 233 according to the transfer order table 234.

The notification part 236 causes the display 214 to display information based on the determination result of the comparison/determination part 235, such as information on the program determined to have been changed, transfer options and the like. For example, when the determination result indicates that both the control program 111 and the HMI program 112 have been changed, the notification part 236 presents an option to simultaneously transfer the control program 111 and the HMI program 112. When the determination result indicates that only the control program 111 has been changed, the notification part 236 presents an option to transfer only the control program 111. When the determination result indicates that only the HMI program 112 has been changed, the notification part 236 presents an option to transfer only the HMI program 112. When the determination result indicates that neither the control program 111 nor the HMI program 112 has been changed, the notification part 236 presents an option not to transfer the two programs, that is, to cancel the transfer.

The user operates the input part 211 to select from the presented options. The transfer manager 231 controls the HMI transfer part 232 or the controller transfer part 233 and executes the transfer process in accordance with the transfer request of the program including the selected option indicated by the user operation content received via the input part 211.

(G2. Program Transfer Due to Differences in Variables)

In the process described above, the comparison between the programs is based on the criteria such as the file name, the creation date, the size, the hash value and the like, but the criteria for comparison may be variables used in the programs.

Figure 9:
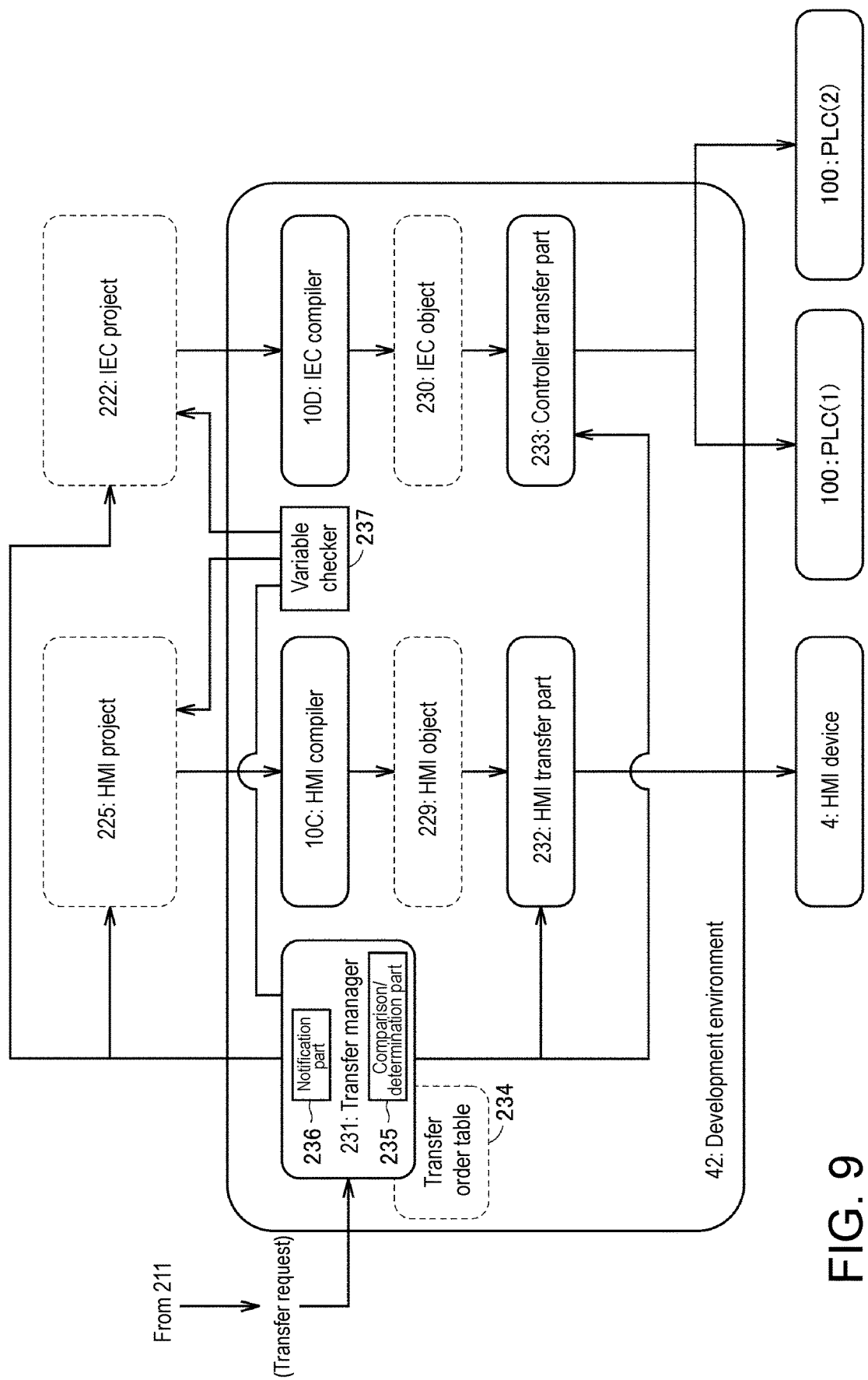
FIG. 9 is a diagram schematically showing another configuration example of the development environment 42 according to an embodiment of the disclosure.
Figure 10:
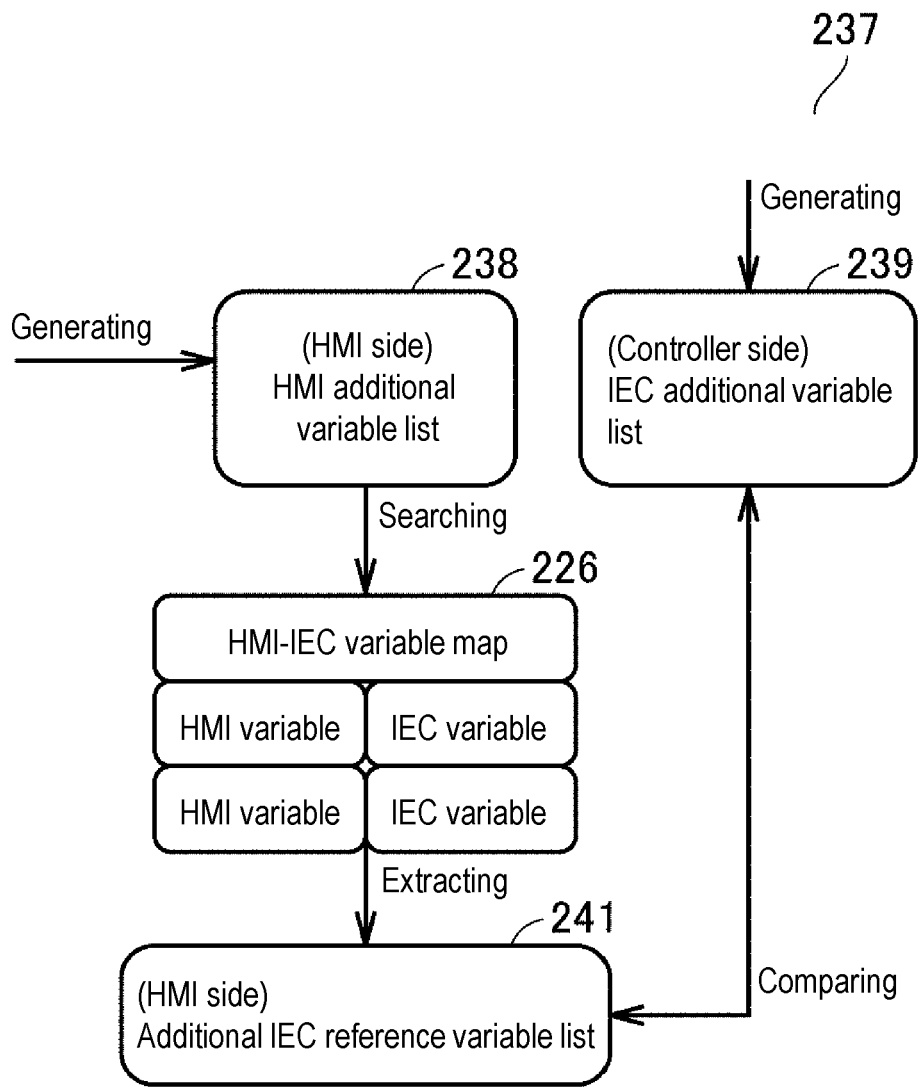
FIG. 10 is a diagram schematically showing an example of a process by the variable checker 237 according to an embodiment of the disclosure.

FIG. 9 is a diagram schematically showing another configuration example of the development environment 42 according to an embodiment of the disclosure. The development environment 42 of FIG. 9 includes a variable checker 237 in addition to the configuration of FIG. 7, and the description is not repeated because other configurations are the same as those shown in FIG. 7. FIG. 10 is a diagram schematically showing an example of a process by the variable checker 237 according to an embodiment of the disclosure. The variable checker 237 compares the variables used by the programs between the control program 111 and the HMI program 112. The comparison/determination part 235 determines based on the output of the variable checker 237 whether each edited program has been changed from the corresponding program being executed by the target device.

In the embodiment, the HMI program 112 mainly includes variables and a program code of the HMI process including a call of the UI component 501 using the corresponding variables. Further, the control program 111 includes variables and a program code such as a control calculation using the variables. Such variables include global variables which are commonly used to exchange data between different programs, and local variables which are handled only within each program. Whether the program has been changed is determined based on differences in the variables or differences in the program code indicating the process content. The variable checker 237 according to this embodiment detects the differences in global variables.

A specific example of the variable check process by the variable checker 237 will be described with reference to FIG. 10. In the variable check process, first, the variable checker 237 compares an HMI variable list indicated by the HMI variable definition 228 of the HMI project 225 with an HMI variable list (a variable list of HMI variable definitions of the HMI module 229-1) used by the HMI program 112 being executed by the HMI device 4, and generates from the comparison result an HMI additional variable list 238 indicating the variables added to the HMI variable definition 228 by this editing. Further, the variable checker 237 compares an IEC variable list indicated by the IEC variable definition 227 of the IEC project 222 with an IEC variable list (a variable list of IEC variable definitions of the IEC module 230-1) used by the control program 111 being executed by the PLC 100, and generates from the comparison result an IEC additional variable list 239 indicating the variables added to the IEC variable definition 227 by this editing.

The variable checker 237 further searches the HMI-IEC variable map 226 based on the variables in the HMI additional variable list 238 to extract the HMI variables registered in the HMI-IEC variable map 226 from the HMI variables added by editing. The variable checker 237 creates an additional IEC reference variable list 241 from the HMI variables extracted in this way, and compares the created additional IEC reference variable list 241 with the IEC additional variable list 239. The variable checker 237 outputs the result of the comparison.

The transfer manager 231 activates the HMI compiler 10C and the IEC compiler OD to generate the HMI object 229 and the IEC object 230 when the comparison result from the variable checker 237 indicates that the variables in the additional IEC reference variable list 241 and the IEC additional variable list 239 match. The transfer manager 231 then controls the controller transfer part 233 and the HMI transfer part 232 so that the generated objects are transferred in the order according to the transfer order table 234.

In this way, when the variable checker 237 determines that the variable added to the control program 111 is also added as a variable in the HMI program 112, the transfer manager 231 can activate the compiler to transfer both the HMI object 229 and the IEC object 230 based on the edited project.

In this case, the transfer is executed according to the transfer order table 234, whereby the transfer manager 231 can start the transfer of the HMI object 229 to the HMI device 4 after the transfer of the IEC object 230 to the PLC 100 is completed (after receiving the transfer completion response from the PLC 100).

(G3. Notification of Program Code (Logic) Change)

In the above embodiment, the program transfer is executed when the variable checker 237 detects a change in the variable, and the program transfer in the case where the program transfer is executed but a change in the variable is not detected will be described below.

In this case, when the variable checker 237 does not detect a change of the variable, but there is a change of the program code indicating the process content (logic), the transfer manager 231 transfers the program, transmits a predetermined notification to the HMI device 4, and outputs the program to the display 481.

Specifically, for example, when the control program 111 is edited, the logic (control calculation logic) may be changed by changing the program code even if the variables used in the program are not changed. In this case, if the variable used by the HMI program 112 indicates the value of the execution result of the calculation logic, the monitor operation (for example, the display mode of the image and the like) by the UI component 501 based on the value of the corresponding variable changes. Under this background, when the transfer manager 231 does not detect a change in the variable from the output of the variable checker 237 and the comparison/determination part 235 detects a change in the program code of the control program 111, the transfer manager 231 performs a program transfer to the PLC 100 and transmits an output instruction of a predetermined message to the HMI device 4. The predetermined message includes, for example, a message indicating that "since the logic of the control program has been changed, the monitor operation on the HMI screen may be affected."

The detection of the change in the program code of the control program 111 by the comparison/determination part 235 includes the detection based on a comparison result such as the comparison of the program code of the control program 111, the comparison of the checksum of the program code, the comparison of the hash value described above, and the like.

Upon receiving the output instruction of the message, the HMI device 4 causes the display 481 to output the message. By outputting the message on the HMI screen, it is possible to give the operator advice that a necessary function check should be executed on the HMI screen when the control program 111 after transfer is activated by the PLC 100.

In this case, the transfer manager 231 determines the HMI device 4, which is the transmission target of the output instruction of the message, as follows, for example. That is, the transfer manager 231 collects the identifier of the target PLC 100 stored by each HMI device 4 connected to the network, and compares each collected identifier with the identifier of the transfer destination PLC 100 stored by the IEC object 230. Based on the comparison result, the transfer manager 231 determines the HMI device 4 having an identifier that matches the identifier of the PLC 100 stored by the IEC object 230 as the transmission target of the output instruction of the message.

H. PROCESS BY SUPPORT PROGRAM

The process of the support program 700 will be described with reference to the flowcharts of FIGS. 11 to 13.

(H1. Transfer Based on Transfer Order Table)

Figure 11:
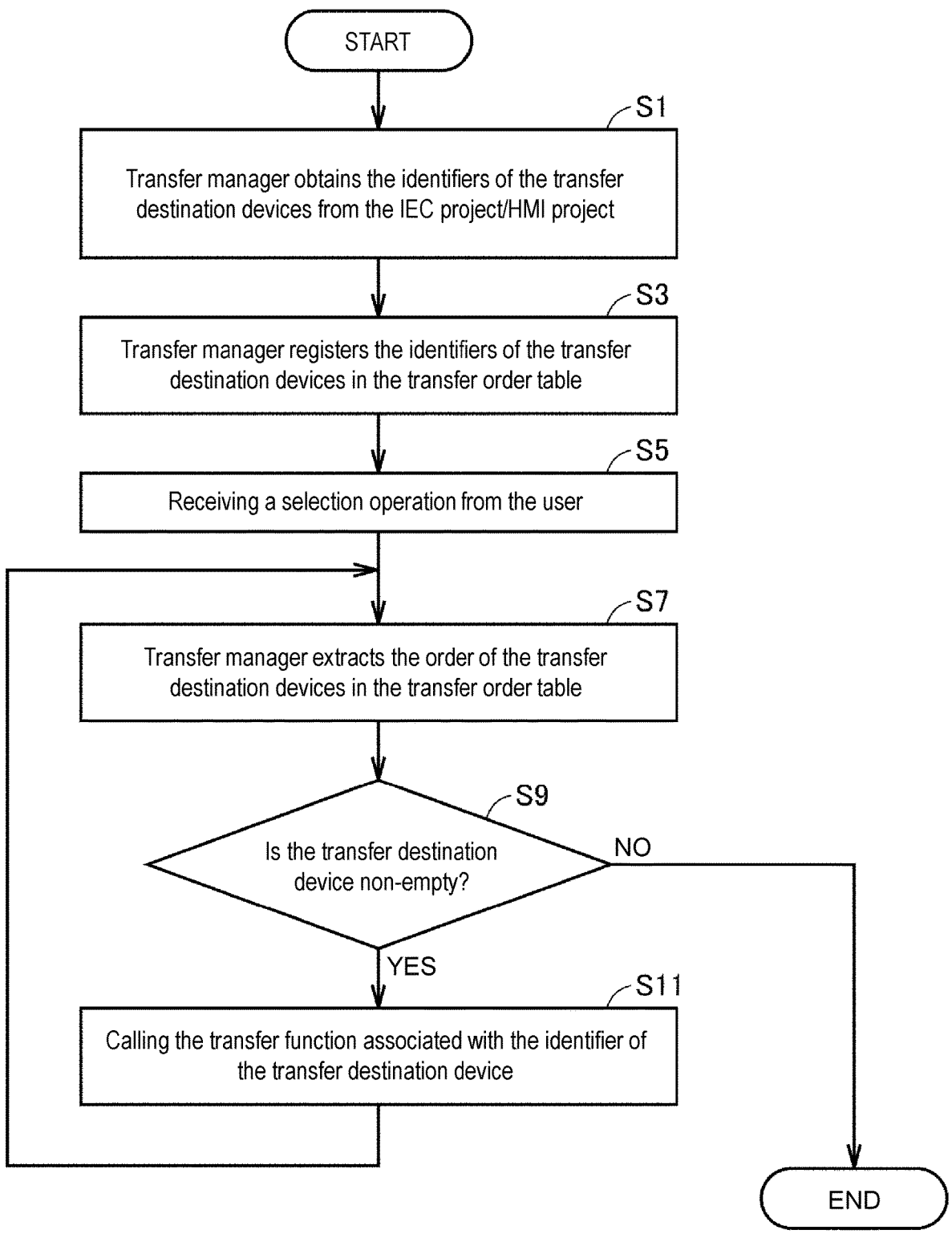
FIG. 11 is a flowchart showing an example of a transfer process according to the transfer order table 234 according to an embodiment of the disclosure.

FIG. 11 is a flowchart showing an example of a transfer process according to the transfer order table 234 according to an embodiment of the disclosure. When the HMI editor 10A or the IEC editor 10B creates (edits) the HMI program 112 or the control program 111, the CPU 202 activates the transfer manager 231.

With reference to FIG. 11, the transfer manager 231 extracts the identifiers of the devices (the HMI device 4 and the PLC 100), which are transfer destinations of the HMI object 229 and the IEC object 230, from the devices connected to the HMI device 4 by scanning the HMI object 229 and the IEC object 230 (Step S1), and registers information in the transfer order table 234 using the extracted identifiers (Step S3).

When the transfer manager 231 receives an operation of selecting the object transfer from the user via the input part 211 (Step S5), the transfer manager 231 transfers the HMI object 229 or the IEC object 230 from the devices connected to the support device 200 to the transfer destination device specified by the transfer order table 234 in the order specified by the transfer order table 234 (Steps S7 to S1).

Here, the transfer manager 231 searches in order from the beginning of the transfer order table 234 and reads out the identifier of the transfer destination device. The transfer manager 231 determines whether the read identifier of the transfer destination device indicates "empty" (Step S9). When it is determined that the read transfer destination device is "non-empty" (YES in Step S9), the transfer manager 231 transfers the object to the device address with the corresponding identifier via the transfer part (the HMI transfer part 232 or the controller transfer part 233) associated with the identifier of the transfer destination device (Step S11). After that, the process returns to Step S7, and the subsequent processes are repeated. On the other hand, when the transfer manager 231 determines that the read identifier of the transfer destination device indicates "empty" (NO in Step S9), a series of transfer processes end.

In this way, when the control program 111 or the HMI program 112 is edited, the transfer manager 231 is activated, and the transfer manager 231 transfers the IEC object 230 (the control program 111) to the PLC 100 via the controller transfer part 233, and at the same time transfers the HMI object 229 (the HMI program 112) to the HMI device 4 via the HMI transfer part 232.

(H2. Transfer Based on Transfer Request of User Operation)

Figure 12:
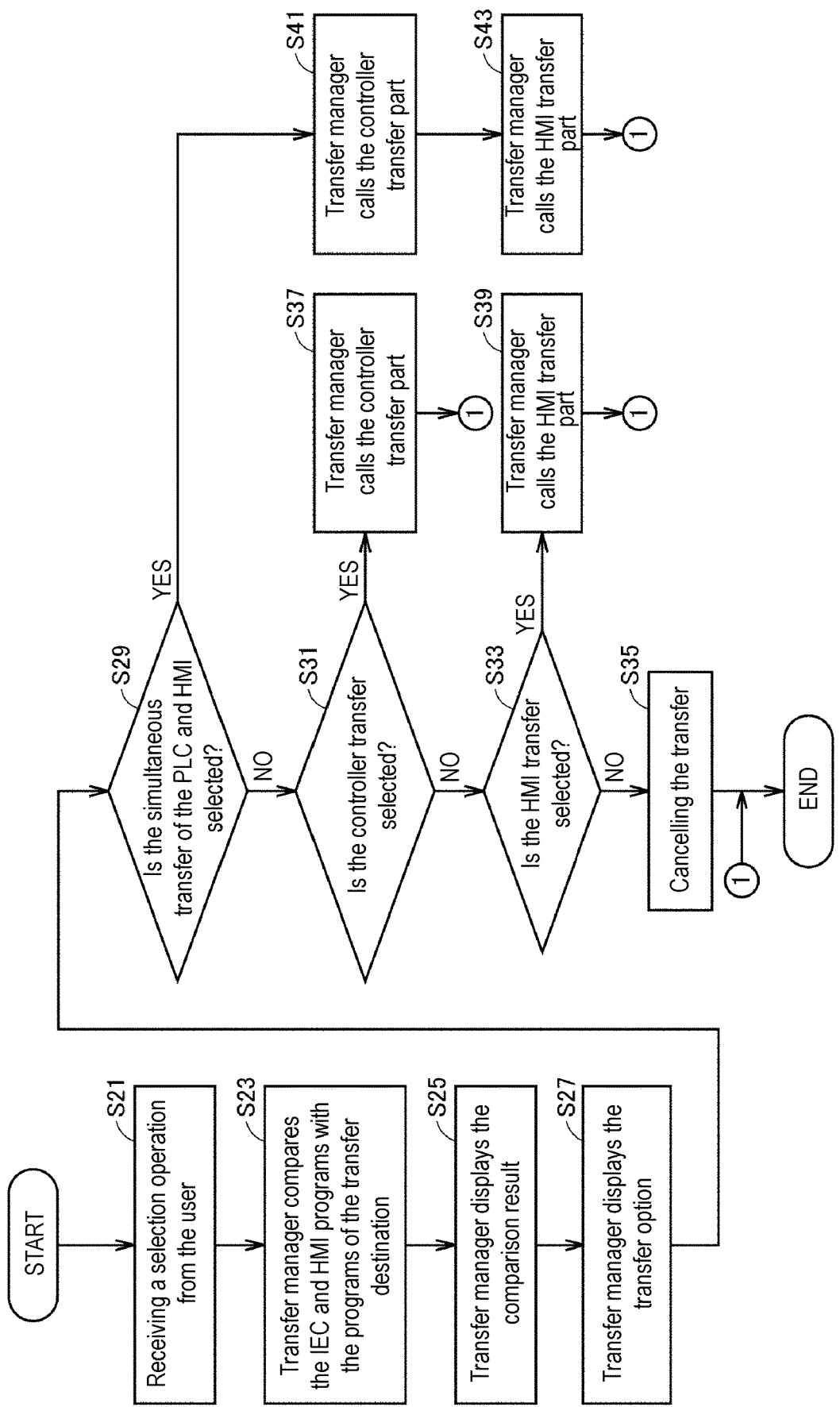
FIG. 12 is a flowchart showing an example of a transfer process based on a user operation according to an embodiment of the disclosure.

FIG. 12 is a flowchart showing an example of a transfer process based on a user operation according to an embodiment of the disclosure. With reference to FIG. 12, when the transfer manager 231 is activated, it receives an operation of selecting data transfer from the user (Step S21). The comparison/determination part 235 compares each program of the control program 111 edited by the IEC editor 10B or the HMI program 112 edited by the HMI editor 10A with the corresponding program being executed by the PLC 100 or the HMI device 4 that is the target device. In this case, the comparison/determination part 235 executes comparison between objects, for example (Step S23).

The notification part 236 of the transfer manager 231 displays a message based on a result of the determination based on the comparison by the comparison/determination part 235 on the display 214 (Step S25), and displays the transfer option on the display 214 (Step S27).

The transfer manager 231 controls the HMI transfer part 232 or the controller transfer part 233 and executes the transfer process in accordance with the user operation content via the input part 211, that is, the transfer request indicated by the transfer option selected by the user (Steps S29 to S43).

It is determined whether the transfer request indicates the simultaneous transfer of the control program 111 and the HMI program 112 to both the PLC 100 and the HMI device 4 (Step S29). When it is determined that the simultaneous transfer is indicated (YES in Step S29), the transfer manager 231 calls (activates) the controller transfer part 233 according to the transfer order table 234, and the controller transfer part 233 transfers the IEC object 230 (Step S41). When the transfer manager 231 receives the transfer completion response from the transfer destination PLC 100, the transfer manager 231 calls (activates) the HMI transfer part 232 according to the transfer order table 234, and the HMI transfer part 232 transfers the HMI object 229 (Step S43). When the transfer manager 231 receives the transfer completion response from the transfer destination HMI device 4, the process ends.

When the transfer manager 231 does not determine that the simultaneous transfer is indicated (NO in Step S29), the transfer manager 231 determines whether the transfer request indicates the transfer of the control program 111 to the PLC 100 only (Step S31). When it is determined that the transfer to the PLC 100 only is indicated (YES in Step S31), the transfer manager 231 calls (activates) the controller transfer part 233 according to the transfer order table 234, and the controller transfer part 233 transfers the IEC object 230 (Step S37). When the transfer manager 231 receives the transfer completion response from the transfer destination PLC 100, the process ends.

When the transfer manager 231 does not determine that the transfer to the PLC 100 only is indicated (NO in Step S31), the transfer manager 231 determines whether the transfer request indicates the transfer of the HMI program 112 to the HMI device 4 only (Step S33). When it is determined that the transfer to the HMI device 4 only is indicated (YES in Step S33), the transfer manager 231 calls (activates) the HMI transfer part 232 according to the transfer order table 234, and the HMI transfer part 232 transfers the HMI object 229 (Step S39). When the transfer manager 231 receives the transfer completion response from the transfer destination HMI device 4, the process ends.

Further, when it is not determined that the transfer to the HMI device 4 only is indicated (NO in Step S33), the transfer manager 231 cancels the execution of the transfer process (Step S35), and the process ends.

(H3. Transfer Based on Changes in Variables)

Figure 13:
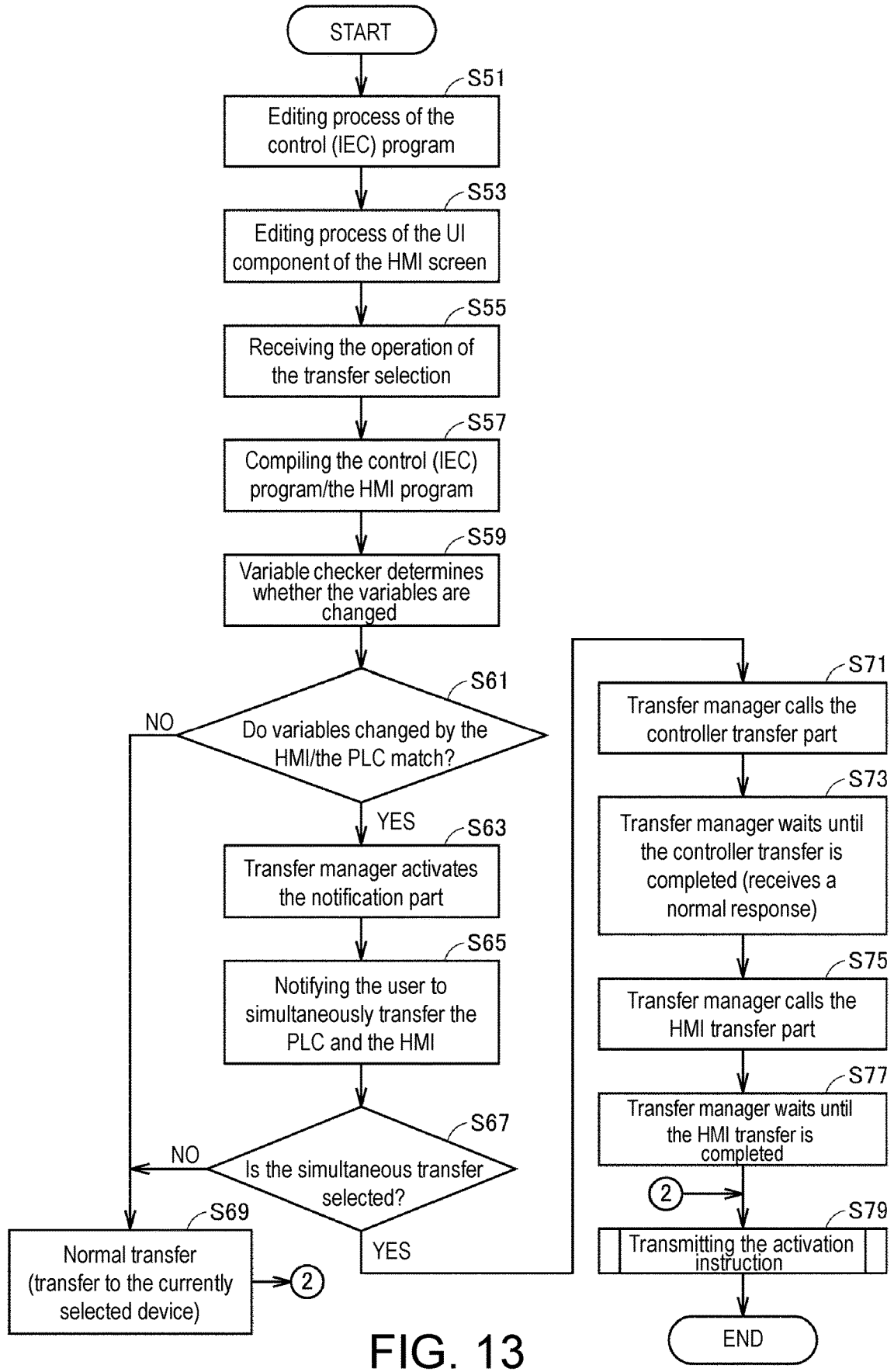
FIG. 13 is a flowchart showing an example of a transfer process based on a change in the variable according to an embodiment of the disclosure.

FIG. 13 is a flowchart showing an example of a transfer process based on a change in the variable according to an embodiment of the disclosure. In the process of FIG. 13, the HMI program 112 is edited by the HMI editor 10A. In this case, a case where the variable used by the UI component 501 configuring the HMI program 112 is changed and the variable is a variable newly added by editing the control program 111 will be described as an example.

First, the IEC editor 10B creates (edits) the control program 111 according to the user operation received via the input part 211 (Step S51). A new variable is added by editing this control program 111. In such a change of the new variable, the IEC editor 10B edits (changes) the IEC variable definition 227 to add the definition of the new variable.

Further, the HMI editor 10A changes the variable used by the UI component 501 configuring the HMI program 112 to the new variable according to the user operation received via the input part 211 (Step S53). In such a change of the variable, the HMI Editor 10A edits (changes or the like) the HMI variable definition 228 and the HMI-IEC variable map 226 to define the new variable after the change.

The editing processes of Steps S51 and S53 creates the edited HMI project 225 and the edited IEC project 222.

When the transfer manager 231 receives the user operation of the transfer selection via the input part 211 (Step S55), the transfer manager 231 activates the HMI compiler 10C and the IEC compiler 10D. The HMI compiler 10C compiles the edited HMI project 225 and creates the HMI object 229. Further, the IEC compiler 10D compiles the edited control program 111 and generates the IEC object 230 (Step S57).

The transfer manager 231 activates the variable checker 237, and determines whether the variables changed by the HMI program 112 and the control program 111 match based on the output from the variable checker 237 (Steps S59 and S61). That is, the transfer manager 231 determines whether the new variable added by the control program 111 is newly used in the UI component configuring the HMI program 112.

When the transfer manager 231 does not determine that the variables changed by the HMI program 112 and the control program 111 match (NO in Step S61), the transfer manager 231 executes a normal transfer (Step S69). That is, the transfer manager 231 activates the HMI transfer part 232 and the controller transfer part 233, and transfers the IEC object 230 and the HMI object 229 respectively to the PLC 100 and the HMI device 4 selected in advance by the user from the devices connected to the network. Upon receiving the transfer completion response from both devices, the transfer manager 231 executes an activation process of Step S79 (to be described later).

Returning to Step S61, when the transfer manager 231 determines that the variables changed by the HMI program 112 and the control program 111 match (YES in Step S61), the transfer manager 231 activates the notification part 236 (Step S63).

When activated, the notification part 236 causes the display 214 to display a notification of an option to transfer the control program 111 and the HMI program 112 simultaneously according to the instruction from the transfer manager 231 (Step S65).

The transfer manager 231 determines whether the user has selected the option of the simultaneous transfer based on the user operation received via the input part 211 (Step S67). When the transfer manager 231 determines that the option of the simultaneous transfer is not selected (NO in Step S67), the transfer manager 231 proceeds to the process of Step S69. On the other hand, when the transfer manager 231 determines that the option of the simultaneous transfer is selected (YES in Step S67), the transfer manager 231 executes the transfer process of and after Step S71.

Specifically, the transfer manager 231 transfers the IEC object 230 and the HMI object 229 to the device (the PLC 100 or the HMI device 4) by using the corresponding transfer function (the controller transfer part 233 or the HMI transfer part 232) according to the transfer order data in the transfer order table 234. First, the transfer manager 231 activates the controller transfer part 233 (Step S71), and the activated controller transfer part 233 transfers the IEC object 230 to each PLC 100 in order according to the transfer order data.

When the transfer manager 231 receives a transfer completion response from each PLC 100 via the controller transfer part 233 (Step S73), the transfer manager 231 activates the HMI transfer part 232 (Step S75), and the activated HMI transfer part 232 transfers the HMI object 229 to each HMI device 4 in order according to the transfer order data.

When the transfer manager 231 receives a transfer completion response from each HMI device 4 via the HMI transfer part 232 (Step S77), the transfer manager 231 transmits an activation instruction 251 (Step S79). The activation instruction 251 is transmitted to each HMI device 4, which is the transfer destination of the HMI object 229, and each PLC 100, which is the transfer destination of the IEC object 230.

I. ACTIVATION PROCESS

Figure 14:
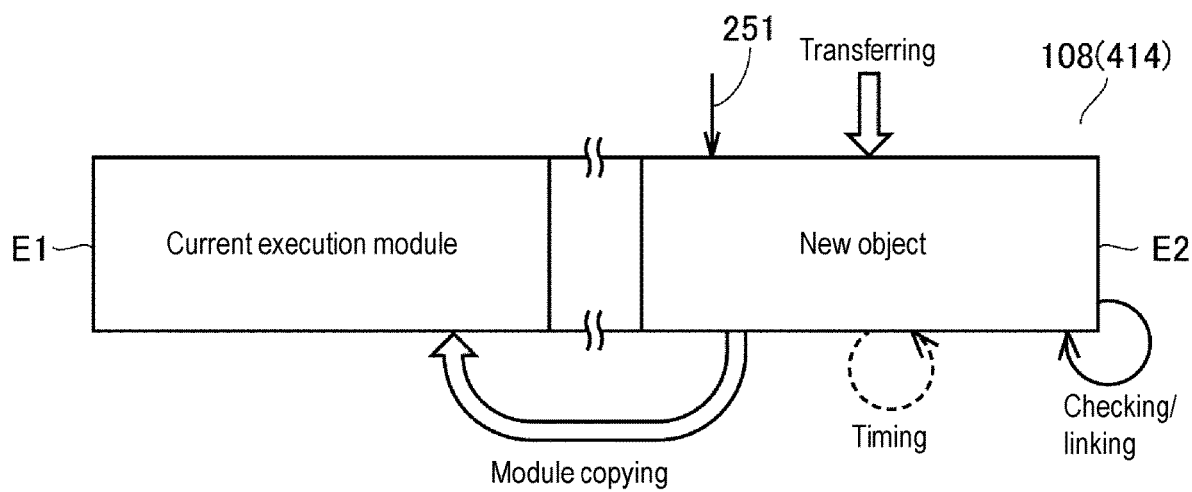
FIG. 14 is a diagram schematically illustrating an example of the activation process according to an embodiment of the disclosure.

An example of the activation process executed according to the activation instruction 251 will be described. FIG. 14 is a diagram schematically illustrating an example of the activation process according to an embodiment of the disclosure. FIG. 14 shows the activation process in association with the stored contents of the flash memory 108 of the PLC 100 and the flash ROM 414 of the HMI device 4.

For example, the flash memory 108 of the PLC 100 includes areas E1 and E2, and the area E1 stores the execution module currently being executed by the PLC 100, and the area E2 stores an object which is the IEC object 230 transferred from the support device 200. When the processor 102 of the PLC 100 completes storing the IEC object 230 received from the support device 200 in the area E2, the processor 102 transmits the above transfer completion response. When the processor 102 receives the activation instruction 251 from the support device 200 after transmitting the response, the processor 102 scans and checks the object in the area E2 (executes necessary error correction), and generates an execution module which is an executable object code by linking the corresponding object with an object of various functions of a library (not shown) or the like. The execution module is copied (overwritten) to the area E1. After that, the execution module generated by the object copied to the area E1 is executed by the PLC 100.

Similarly, in each HMI device 4 as well, when the CPU 411 completes storing the HMI object 229 received from the support device 200 in the area E2 of the flash ROM 414, the CPU 411 transmits the transfer completion response. When the CPU 411 receives the activation instruction 251 from the support device 200 after transmitting the response, the CPU 411 scans and checks the object in the area E2 (executes necessary error correction), generates an execution module which is an executable object code by linking the corresponding object with the object of the UI component 501 of the library 113 or the like, and copies (overwrites) the generated execution module to the area E1. After that, the execution module generated by the new HMI object 229 copied to the area E1 is executed by the HMI device 4.

The activation instruction 251 described above may be transmitted to each PLC 100 and each HMI device 4 together with the transferred objects (the IEC object 230 and the HMI object 229). The activation instruction 251 may include information for timing the time to start executing the activation process. This time may be relative time or absolute time. The relative time includes, for example, a predetermined length of elapsed time since the transfer completion response is transmitted. Further, the absolute time includes, for example, a predetermined time (hour/minute/second) measured by timers, assuming that the timers of each PLC 100 and each HMI device 4 are synchronized.

In this way, the support device 200 can transmit the activation instruction 251 without waiting for the reception of the transfer completion response from each PLC 100 and each HMI device 4, and can execute the activation process in each PLC 100 and each HMI device 4 at a synchronized timing.

In the above embodiment, regarding the editing of the HMI program 112, the editing of the HMI program 112 itself has been described, but the editing of the UI component which is a program configuring the HMI program 112 may be used. For example, when the number of variables used by the UI component is changed by editing, or the program code of the UI component is changed, the UI component is compiled and its object is transferred to the HMI device 4. The HMI device 4 rewrites the UI component of the library 113 with the UI component received from the support device 200 based on the activation instruction 251 from the support device 200.

J. PROGRAM

The support program 700, which provides the program development environment 42 by executing the processes of each flowchart shown in the embodiment, is stored in the storage part (the ROM 204, the RAM 206, the HDD 208, the recording medium 250, and the like) of the support device 200. By reading the support program from the storage part and executing it, the CPU 202 can realize various processes in the development environment 42 described in the embodiment.

Such support program 700 can be recorded on a computer-readable recording medium such as a flexible disk, a compact disk-read only memory (CD-ROM), a ROM, a RAM, and the recording medium 250 attached to the support device 200, and it can also be provided as a program product. Alternatively, the program can be provided by being recorded on a recording medium such as the HDD 208 built in the support device 200. Further, the program can also be provided by being downloaded from a network (not shown) via the communication interface.

K. APPENDIX

The embodiments as described above include the following technical concepts.

[Configuration 1]

A support device (200) which supports development of a program to be executed by a target device (4, 100) provided in factory automation (FA), wherein the target device includes a control device (100) which controls a machine of the FA and a human machine interface (HMI) device (4), the support device includes:

an editing part (10A, 10B) which edits the program; and a transfer management part (231) which executes a transfer process for transferring the program that is edited to the target device, the program includes a control program (111) for controlling the machine and an HMI program (112) for processing a variable used by the control program, and the transfer management part includes a part which executes the transfer process to simultaneously transfer the control program and the HMI program respectively to the control device and the HMI device when the control program or the HMI program is edited by the editing part.

[Configuration 2]

The support device according to configuration 1, further including:

a determination part (235) which compares each program of the control program or the HMI program that is edited by the editing part with a corresponding program being executed by the target device to determine based on a result of the comparison whether each of the programs that is edited has been changed from the corresponding program being executed, wherein the transfer management part further includes a part which executes the transfer process to transfer one or both programs determined to have been changed among each program of the control program and the HMI program edited by the editing part.

[Configuration 3]

The support device according to configuration 2, further including:

a notification part (236) which makes information based on a determination result by the determination part be displayed on a display; and an operation receiving part (211) which receives a user operation on the support device, wherein the transfer management part includes a part which executes the transfer process to transfer one or both programs indicated by a received user operation content among each program of the control program and the HMI program edited by the editing part.

[Configuration 4]

The support device according to any one of configurations 1 to 3, wherein an activation instruction (251) for activating each program after transfer is transmitted to the target device when the transfer process of the control program or the HMI program is executed by the transfer management part.

[Configuration 5]

The support device according to configuration 4, wherein the activation instruction includes information on a time for activating each program after transfer.

[Configuration 6]

The support device according to configuration 4, wherein the activation instruction is transmitted to the target device when a notification that the transfer of the program is completed is received from the target device.

[Configuration 7]

The support device according to any one of configurations 1 to 6, wherein the HMI program includes a user interface (UI) component (501) which is a program that configures the HMI program and which processes the variable, and editing of the HMI program includes editing of the UI component.

[Configuration 8]

The support device according to any one of configurations 1 to 7, wherein the control program includes a variable and a program code which indicates a process content using the variable, and a predetermined notification is output to a display (481) of the HMI device when a result of the comparison indicates that the program code is changed without the variable changed.

[Configuration 9]

A support program (700) which supports development of a program to be executed by a target device (100, 4) provided in factory automation (FA), wherein the target device includes a control device (100) which controls a machine provided in the FA and a human machine interface (HMI) device (4), wherein the support program is configured to make a computer (200) execute:

editing the program; and executing a transfer process for transferring the program that is edited to the target device, the edited program includes a control program (111) for controlling the machine and an HMI program (112) for processing a variable used by the control program, and the executing the transfer process includes executing the transfer process to simultaneously transfer the control program and the HMI program respectively to the control device and the HMI device when the control program or the HMI program is edited.

The embodiments disclosed herein are exemplary and should not be construed restrictive in all aspects. The scope of the disclosure is defined by the claims instead of the above descriptions, and it is intended to include the equivalent of the scope of the claims and all modifications within the scope.

What is claimed is:

1. A support device which supports development of a program to be executed by a target device provided in factory automation (FA), wherein the target device comprises a control processor, wherein the control processor is configured to control a machine of the FA and a human machine interface (HMI) device, wherein the support device comprises:

a processor, wherein the processor is configured to implement:

an editing part which edits the program; and a transfer management part which executes a transfer process for transferring the program that is edited to the target device, the program comprises a control program for controlling the machine and an HMI program for processing a variable used by the control program, and the transfer management part comprises a part which executes the transfer process to simultaneously transfer the control program and the HMI program respectively to the control processor and the HMI device when the control program or the HMI program is edited by the editing part.

2. The support device according to claim 1, wherein the processor is further configured to implement:
a determination part which compares each program of the control program or the HMI program that is edited by the editing part with a corresponding program being executed by the target device to determine based on a result of the comparison whether each of the programs that is edited has been changed from the corresponding program being executed,
wherein the transfer management part further comprises a part which executes the transfer process to transfer one or both programs determined to have been changed among each program of the control program and the HMI program edited by the editing part.

3. The support device according to claim 2, wherein the processor is further configured to implement:
a notification part which makes information based on a determination result by the determination part be displayed on a display; and
an operation receiving part which receives a user operation on the support device,
wherein the transfer management part comprises a part which executes the transfer process to transfer one or both programs indicated by a received user operation content among each program of the control program and the HMI program edited by the editing part.

4. The support device according to claim 1, wherein an activation instruction for activating each program after transfer is transmitted to the target device when the transfer process of the control program or the HMI program is executed by the transfer management part.

5. The support device according to claim 4, wherein the activation instruction comprises information on a time for activating each program after transfer.

6. The support device according to claim 4, wherein the activation instruction is transmitted to the target device when a notification that the transfer of the program is completed is received from the target device.

7. The support device according to claim 1, wherein the HMI program comprises a user interface (UI) component which is a program that configures the HMI program and which processes the variable, and
editing of the HMI program comprises editing of the UI component.

8. The support device according to claim 1, wherein the control program comprises a variable and a program code which indicates a process content using the variable, and
a predetermined notification is output to a display of the HMI device when a result of the comparison indicates that the program code is changed without the variable changed.

9. A non-transient computer-readable recording medium, recording a support program which supports development of a program to be executed by a target device provided in factory automation (FA),
wherein the target device comprises a control processor, wherein the control processor is configured to control a machine provided in the FA and a human machine interface (HMI) device,
wherein the support program is configured to make a computer execute:
editing the program; and
executing a transfer process for transferring the program that is edited to the target device,
the edited program comprises a control program for controlling the machine and an HMI program for processing a variable used by the control program, and
the executing the transfer process comprises executing the transfer process to simultaneously transfer the control program and the HMI program respectively to the control processor and the HMI device when the control program or the HMI program is edited.

* * * * *